United States Patent [19]

Kurasawa

[11] Patent Number: 4,853,155
[45] Date of Patent: Aug. 1, 1989

[54] ELECTRICALLY CONDUCTIVE SYNTHETIC RESIN COMPOSITION

[75] Inventor: Morio Kurasawa, Tokyo, Japan

[73] Assignee: Kurasawa Optical Industry Co., Ltd., Japan

[21] Appl. No.: 77,424

[22] Filed: Jul. 24, 1987

[30] Foreign Application Priority Data

Jul. 26, 1986 [JP] Japan ................................. 61-176365

[51] Int. Cl.$^4$ ............................................. H01B 1/06
[52] U.S. Cl. ..................................... 252/512; 252/511; 252/518; 523/137; 524/401; 524/439
[58] Field of Search ..................... 252/512, 516, 518; 523/137; 524/401, 439

[56] References Cited

U.S. PATENT DOCUMENTS

| | | | |
|---|---|---|---|
| 3,996,167 | 12/1976 | Brown | 252/512 |
| 4,678,602 | 7/1987 | Tanaka et al. | 252/512 |
| 4,696,764 | 9/1987 | Yamazuki | 252/518 |
| 4,704,413 | 11/1987 | Nabeta et al. | 252/511 |

*Primary Examiner*—Josephine Barr
*Attorney, Agent, or Firm*—Griffin, Branigan & Butler

[57] ABSTRACT

An electrically conductive synthetic resin comprises a synthetic resin mixed with at least one kind of niobium and niobic substances by melting in which the synthetic resin contains the latter substances in an amount of 0.5 to 25 percent by weight. If it therefore possible to improve the electrical conductivity of synthetic resins to prevent the occurrence of electrostatic charges thereby realizing a satisfactory shielding effect with respect to electromagnetic waves without damaging the characteristics inherent in the constituent synthetic resin.

4 Claims, No Drawings

ELECTRICALLY CONDUCTIVE SYNTHETIC RESIN COMPOSITION

BACKGROUND OF THE INVENTION

1. Field of the Invention

The present invention relates to an electrically conductive synthetic resin typically used for buildings, vehicles and aircraft, as well as for industrial and agricultural purposes.

2. Description of the Related Art

In general, typical synthetic resins have heretofore been utilized as electrical insulators having a volume resistivity of the order of $10^{10}$ $\Omega$/cm$^3$. However, such a conventional type of synthetic resin tends to be electrostatically charged because of its electrical isolating properties. This may lead to various problems; for example, dust may be electrostatically attracted to the surface of such a synthetic resin, the breakdown of an IC may take place, or, occasionally, an explosion might be caused by spark discharge derived from static electricity.

Also, electromagnetic wave noise propagated through air may invade computers or other electronic machines. It is of course necessary to prevent such invasion of unwanted waves. During the period in which electronic machines were typically made of metal, no problems were experienced due to the invasion of electromagnetic wave noise. This is because metal generally has a good shielding effect with respect to electromagnetic waves. However, with the development of integrated circuits and multilayer printed-circuit boards, the demand has risen for further progress in developing electronic devices offering compactness, lightness and adaptability to mass production. In response to such demands, certain kinds of synthetic resin have been utilized for the housings of such electronic devices, and this may result in the occurrence of various problems derived from electromagnetic wave noise.

For this reason, there has been an increasing demand for the advent of synthetic resins having proper electrical conductivity, suitable properties with respect to the prevention of electrostatic charging, and the capability of shielding electronic devices from electromagnetic wave noise. In general, synthetic resins have corrosion resistance, lightness, transparency, good formability and other characteristics which cannot be achieved with metal materials. In a variety of industrial fields, there is a strong demand for the development of a synthetic resin having both the characteristics described above and electrical conductivity of a quality approximately equal to that of metal.

Two types of electrically conductive synthetic resin have heretofore been known; one is of the type constituted by high polymers that themselves have electrical conductivity and the other is of the type constituted by high polymers mixed with finely divided metal or carbon and having an electrically conductive coating, flame-sprayed zinc coating, metal film formed by galvanization, deposited metallic foil or the like for the purpose of providing electrical conductivity.

However, the current techniques have not yet succeeded in imparting a satisfactory level of electrical conductivity to the first of these known types, i.e., an electrically conductive synthetic resin of the type that includes high polymers which themselves have electrical conductivity.

The latter type of electrically conductive synthetic resin is obtained through certain steps of specially treating metal such as silver, copper or aluminium; dividing the thus-obtained metal in the form of powder or flakes; and mixing the powdered or flaked metal with vinyl chloride, poly ethylene or the like by dispersion. In the case of such an electrically conductive synthetic resin, the volume resistivity is in the order of $10^0$ to $10^{-6}$ $\Omega$/cm$^3$ at the best. In order to improve such electrical conductivity, an enormous amount of conductive material may be mixed with polymer by dispersion to provide close contact between the particles of the conductive material. However, this treatment nullifies the aforesaid characteristics that are inherent in a synthetic resin, thus resulting in a deterioration in the formability and mechanical strength thereof. There is another problem in that uniform electrical conductivity cannot be achieved, the extent of this problem depending upon the forming conditions.

Also, the aforesaid electrically conductive coating is typically formed by dispersing fine particles (2 to 3 micron in diameter) of nickel, silver or copper in a resin binder. Production of an electrically conductive synthetic resin covered with such an electrically conductive coating is relatively inexpensive as viewed in terms of plant and equipment as well as in terms of production costs. In addition, such electrically conductive coating is advantageous in that it requires no pre-treatment, in that it can be subjected to natural drying, and in that it is readily applicable to a relatively complicated configuration; accordingly, the aforesaid electrically conductive coating is currently used in a great number of fields. However, in general, electrically conductive coatings may exfoliate or crack over a long period of time, with the result that the shielding effect with respect to electromagnetic waves might be weakened. Also, since a certain period of time is required for drying, it is impossible to provide a mass production line, and this leads to the problem that the production involves a large amount of manual work.

The aforesaid electrically conductive synthetic resin with a flame-sprayed zinc coating is advantageous in terms of electrical conductivity but requires treatment at high temperatures. This may lead to the problem that the synthetic resin product becomes curved.

The aforesaid electrically conductive synthetic resin coated with a metal film formed by galvanization or deposited metallic foil may lose its shielding effect with respect to electromagnetic waves due to exfoliation or the formation of cracks as in the case of the aforementioned electrically conductive coating. This may likewise result in the problem that a mass production line is difficult to constitute.

SUMMARY OF THE INVENTION

It is therefore an object of the present invention to provide an electrically conductive synthetic resin which has proper electrical conductivity capable of preventing the occurrence of electrostatic charges and thereby of realizing a satisfactory shielding effect with respect to electromagnetic waves without damaging the characteristics inherent in the constituent synthetic resin and yet with improving durability.

To achieve the aforesaid object, in accordance with the present invention, a synthetic resin is mixed with at least one kind of niobium and niobic substances by melting such that the synthetic resin containing the latter substances in an amount of 0.5 to 25 percent by weight of the total composition.

The present invention provides the following advantage through the above-described technical means.

The niobium or niobic substances which are mixed by melting with a material forming the synthetic resin make compact the molecular arrangement of a parent material to assist the activity of electrons thereby imparting electrical conductivity to the synthetic resin. Also, since any of such niobium or niobic substances even in a slight amount produces a remarkable effect with respect to electrical conductivity, it is possible to obtain synthetic resins with a relatively high electrical conductivity without damaging the various characteristics of them. In addition, since niobium or niobic substances are mixed with a synthetic resin by melting, it is possible to prevent the occurrence of deterioration with age.

DESCRIPTION OF THE PREFERRED EMBODIMENTS

The synthetic resin in accordance with the present invention may be composed of any kind of material having a high-polymeric structure. Such material is preferably selected from: the group consisting of poly-condensation materials including polyamide or polyester; the group consisting of poly-addition materials including polyurethane; the group consisting of ring-opening-polymeric materials including polyamide; the group consisting of high-polymeric materials including polyethylene, polypropylene, polyacrylonitrile (acrylic resin), polyvinyl alcohol, polyvinyl chloride, polyvinylidene chloride, polyfluoroethylene and polystyrene; the group consisting of copolymeric resins such as polystyrene, ABS resins, SAN resins (AS resins) and ACS resins; the group consisting of vinyl acetate resins; the group consisting of polyvinyl alcohol, polyvinyl formal, polyvinyl acetoacetal, polyvinyl butyral and other synthetic resins including polyvinyl alcohol; polyvinyl ether; the group consisting of cellulose resins such as cellulose ester (acetyl cellulose), nitrocellulose, acetyl butyl cellulose, cellulose ether (methyl cellulose, ethyl cellulose); the group consisting of engineering plastics such as polyamide compounds, polyacetal, polycarbonate, thermosetting polyester forming materials, polyphenylene oxide, noryl resin and polysulfone; the group consisting of fluororesins such as polytetrafluoroethylene, polyfluoroethylene propylene, polytrifluoroethylene chloride, fluororubber, vinylidene fluoride resin; silicon resin; the group consisting of natual rubber and its derivatives such as ebonite, chlorinated rubber, hydrochloride rubber and cyclorubber; the group consisting of butadiene synthetic rubber such as butadiene-styrene copolymer, nitrile rubber (butadiene-acrylonitirile copolymer) and chloroprene rubber; the group consisting of olefinic synthetic rubber such as polyisoprene, butyl rubber, polysulfide synthetic rubber, chlorosulfonic polyester, and other kinds of synthetic rubber; the group consisting of thermosetting resins such as phenol resin, urea resin, melamine resin, xylene resin, diallyl phthalate resin and unsaturated polyester; the group consisting of saturated alkyd resins such as glyptal resin, glyptal-type resins, unsaturated alcohol denatured phthalic acid resin, isophthalic acid resin and terephthalic acid resin; or the group consisting of other polymeric materials such as aliphatic ester, epoxy resin, aniline resin, furan resin, alkylbenzene resin, guanamine resin, polyimide, polybenzimidazole, polyamide imide, polydiphenyl ether, chlorinated polyether, ASA resin, polyurea, polyethylene oxide, polybisdiene and ion exchange resin.

The niobium or niobic substances used in the present invention are preferably selected from the group consisting of metallic niobium, niobium carbide, niobium nitride, stannic niobium, germanic niobium, silicic niobium, aluminum niobium, niobium dioxide, niobium pentoxide, niobic acid lithium, niobium dichloride, niobium trichloride, niobium tetrachloride, niobium pentachloride, niobium oxichloride, niobium difluoride, niobium trifluoride, niobium tetrafluoride, niobium pentafluoride, niobium oxifluoride, niobium dibromide, niobium tribromide, niobium tetrabromide, niobium pentabromide, niobium oxibromide, niobium diiodide, niobium triiodide, niobium tetraiodide, niobium pentaiodide, niobium oxiiodide, niobium alkoxide (niobium ethoxide) and the like.

A material selected from among the previously-described substances which form synthetic resins is mixed by melting with at least one kind of the above noted niobium or noibic substances in which the selected material contains the latter substances in an amount of 0.5 to 25 percent by weight of the total composition, thereby obtaining a desired electrically conductive synthetic resin.

The following is a description of mixture ratios in the respective concrete examples of the present invention as well as the results of tests conducted therewith.

By way of example, a synthetic resin composed of vinyl chloride and niobium pentachloride is used as an electrically conductive material.

|  | Vinylchloride | Niobium Pentachoride | Volume Resistivity |
| --- | --- | --- | --- |
| Example 1 | 99.5 | 0.5 | $10^{-6} \, \Omega/cm^3$ |
| Example 2 | 99.0 | 1.0 | $10^{-6} \, \Omega/cm^3$ |
| Example 3 | 98.5 | 1.5 | $10^{-6} \, \Omega/cm^3$ |
| Example 4 | 98.0 | 2.0 | $10^{-6} \, \Omega/cm^3$ |
| Example 5 | 97.5 | 2.5 | $10^{-6} \, \Omega/cm^3$ |
| Example 6 | 97.0 | 3.0 | $10^{-6} \, \Omega/cm^3$ |
| Example 7 | 96.5 | 3.5 | $10^{-6} \, \Omega/cm^3$ |
| Example 8 | 96.0 | 4.0 | $10^{-6} \, \Omega/cm^3$ |
| Example 9 | 95.5 | 4.5 | $10^{-6} \, \Omega/cm^3$ |
| Example 10 | 95.0 | 5.0 | $10^{-6} \, \Omega/cm^3$ |
| Example 11 | 94.5 | 5.5 | $10^{-6} \, \Omega/cm^3$ |
| Example 12 | 94.0 | 6.0 | $10^{-6} \, \Omega/cm^3$ |
| Example 13 | 93.5 | 6.5 | $10^{-6} \, \Omega/cm^3$ |
| Example 14 | 93.0 | 7.0 | $10^{-6} \, \Omega/cm^3$ |
| Example 15 | 92.5 | 7.5 | $10^{-6} \, \Omega/cm^3$ |
| Example 16 | 92.0 | 8.0 | $10^{-6} \, \Omega/cm^3$ |
| Example 17 | 91.5 | 8.5 | $10^{-6} \, \Omega/cm^3$ |
| Example 18 | 91.0 | 9.0 | $10^{-6} \, \Omega/cm^3$ |
| Example 19 | 90.5 | 9.5 | $10^{-6} \, \Omega/cm^3$ |
| Example 20 | 90.0 | 10.0 | $10^{-6} \, \Omega/cm^3$ |

As can be seen from the respective examples, the electrical conductivity of the inventive synthetic resin is improved to a level three times as high as that of a conventional type of electrically conductive synthetic resin. Accordingly, it is possible to effectively prevent electrostatic charging, thereby achieving a proper shielding effect with respect to electromagnetic wave. The FCC regulations in the United States of America provide that the level of volume resistivity shall be at least $10^{-3} \, \Omega/cm^3$ in order to attain a satisfactory shielding effect with respect to electromagnetic waves, and present invention succeeds in completely meeting this requirement. In addition, since niobium pentachloride is mixed with the synthetic material, it is possible to prevent the occurrence of serious influence which might damage the characteristics inherent in the synthetic resin. Rather, it has been found that heat resistance and wear resistance can be improved by 15 to 20%.

In the aforesaid example, niobium pentachloride is mixed with vinyl chloride by melting such that the former contains the latter in an amount of 0.5 to 10 percent by weight. However, it will be appreciated that an equivalent electrically conducting effect can be obtained even when niobium pentachloride is mixed with vinyl chloride in an amount above such percent by weight. However, when 25 percent by weight is exceeded, the electrically conducting effect is not improved and, in addition, production costs increase.

Additional tests were conducted with respect to synthetic resins other than vinyl chloride and niobium or niobic substances other than niobium pentachloride. In consequence, the same results as described above were achieved, and it was found that a sufficiently high level of electrical conductivity was realized. It was also found that the same level of electrical conductivity was obtained even by using more one kind of the aforesaid niobium and niobic substances. Therefore, in accordance with the present invention, it is preferable to apply at least one kind of niobium and niobic substances to a synthetic resin within the range of 0.5 to 25 percent by weight of the total composition of the latter substances.

As described above, in accordance with the present invention, a synthetic resin is mixed with at least one kind of niobium and niobic substances by melting such that the synthetic resin contains the latter substances in an amount of 0.5 to 25 percent by weight of the total composition. Accordingly, it is possible to improve the electrical conductivity of the synthetic resin to prevent the occurrence of electrostatic charges thereby realizing a satisfactory shielding effect with respect to electromagnetic waves without damaging the characteristics inherent in the constituent synthetic resin. In addition, heat resistance and wear resistance can be improved, and durability is also improved, thereby preventing the occurrence of a deterioration with age. Accordingly, as compared with the prior-art electrically conductive resins, the inventive synthetic resin can be utilized in a great number of fields; for example, it may be applied to vehicles, aircraft, space development, fishery, ships, electronic machines, electronic parts, cameras, buildings, furniture, household utensils, spectacle frames, camera lenses, stationery and others.

What is claim:

1. An electrically conductive synthetic resin composition comprising a high polymeric synthetic resin having mixed therein by melting at least one electrically conductive-component consisting essentially of niobium and niobic substances in which the said synthetic resin contains the niobium or niobic substances in an amount of 0.5 to 25 percent by weight of the total composition.

2. The conductive resin of claim 1, wherein the amount of the niobium substance is sufficient to provide conductivity to the conductive resin such that the conductive resin is capable of preventing the occurrence of electrostatic charges thereon.

3. The conductive resin of claim 1, wherein the synthetic resin is polyvinyl chloride.

4. The conductive resin of claim 1, wherein niobium substance is niobium pentachloride.

* * * * *